United States Patent [19]

Saunders et al.

[11] 4,096,796

[45] Jun. 27, 1978

[54] APPARATUS AND METHOD FOR CONTROLLING PRESS RACKING

[75] Inventors: Robert J. Saunders, Lewiston, Id.; Harold A. Keller, Clarkston, Wash.

[73] Assignee: Potlatch Corporation, Lewiston, Id.

[21] Appl. No.: 642,710

[22] Filed: Dec. 22, 1975

[51] Int. Cl.[2] .............................. B29J 5/00; B29J 5/04

[52] U.S. Cl. ....................................... 100/35; 100/137; 264/120; 425/328

[58] Field of Search ............... 264/109, 112, 120, 113, 264/122, 121, 108; 425/224, 328, 373, 380; 100/151, 153, 35, 137

[56] References Cited

U.S. PATENT DOCUMENTS

| | | | |
|---|---|---|---|
| 502,523 | 8/1893 | Lockstaedt | 100/151 |
| 753,696 | 1/1904 | Geiger | 100/151 |
| 2,087,441 | 7/1937 | Metcalf et al. | 264/112 |
| 2,700,177 | 1/1955 | Mottet | 264/120 |
| 2,811,750 | 11/1957 | Cofek | 264/113 |
| 2,907,071 | 10/1959 | Meiler et al. | 264/120 |
| 2,947,654 | 8/1960 | Chapman | 264/109 |
| 3,096,227 | 7/1963 | Van Elton | 156/64 |
| 3,115,431 | 12/1963 | Stokes et al. | 264/108 |
| 3,150,025 | 9/1964 | Slayter et al. | 156/187 |
| 3,202,743 | 8/1965 | Elmendorf | 264/109 |
| 3,230,287 | 1/1966 | Caron et al. | 264/120 |

*Primary Examiner*—Willard E. Hoag
*Attorney, Agent, or Firm*—Wells, St. John & Roberts

[57] ABSTRACT

Press racking, or lateral movement of the movable portions of a press, occurs in certain particleboard processes during heating and pressing of the panels. It is attributed to shingling of wood particles during the formation of a mat. To eliminate or reduce the movement of the press, the mat is subjected to rolling engagement by a relatively small diameter roll located between the forming apparatus and the press. The roll subjects the mat to a downward rolling pressure. The peripheral roll surface is in contact with the newly formed upper surface of the mat and has a linear speed and direction of movement identical to the speed and direction of movement of the mat support. A resulting wave action within the mat is caused by shear and displacement forces applied to the wood particles, such that the shingled nature of the mat is modified to reduce or eliminate resulting lateral movement of the press components.

6 Claims, 4 Drawing Figures

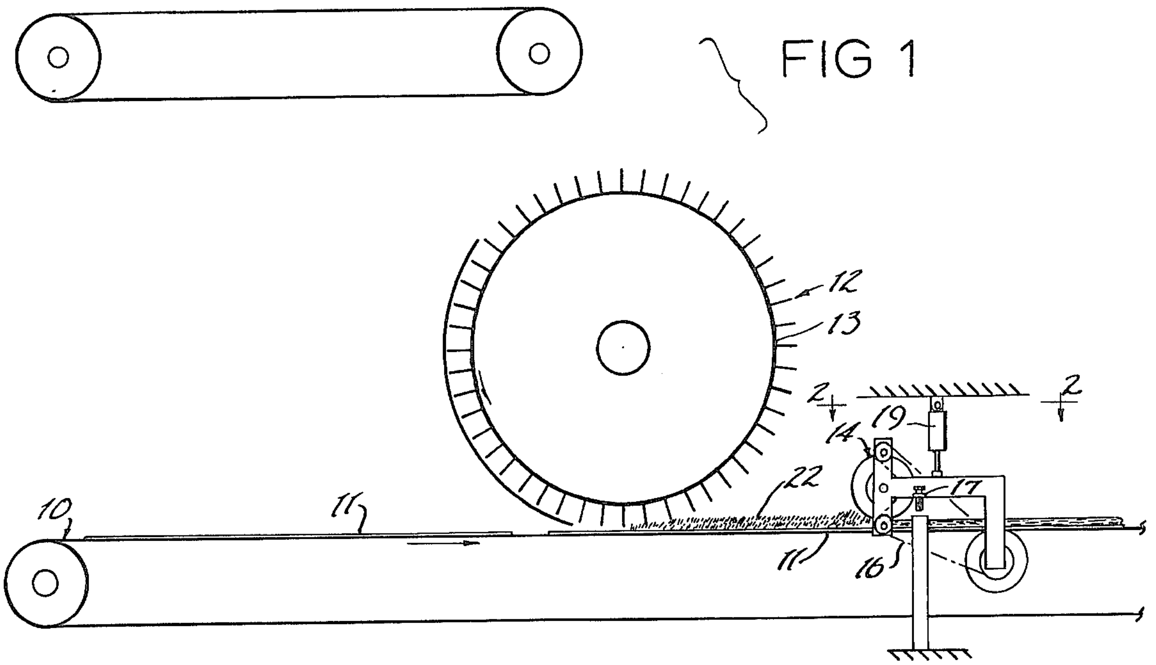
FIG 1
FIG 2
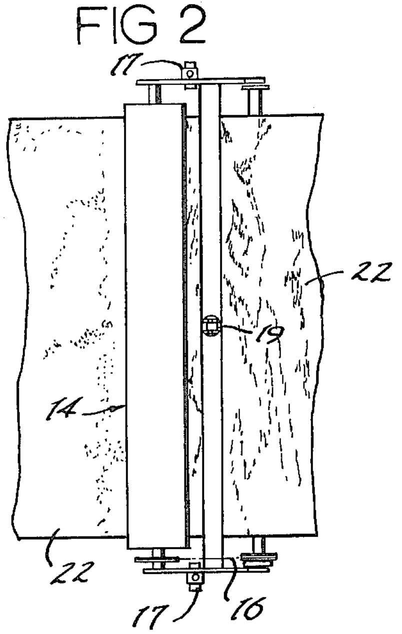
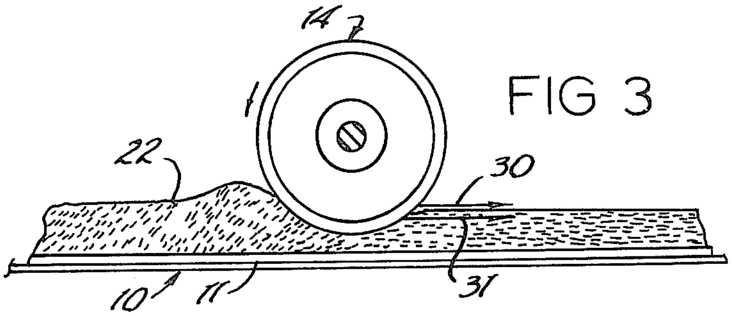
FIG 3
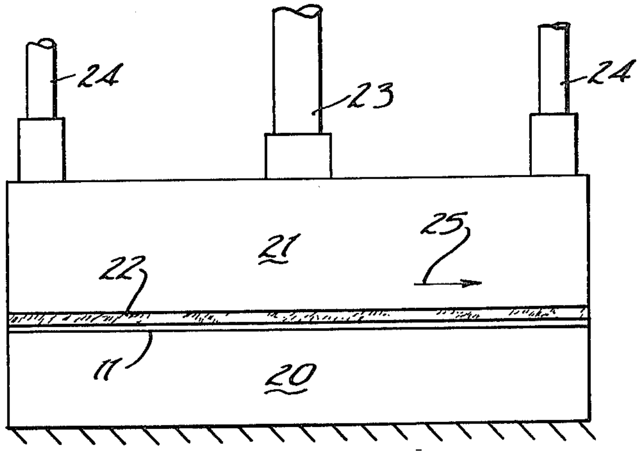
FIG 4

APPARATUS AND METHOD FOR CONTROLLING PRESS RACKING

BACKGROUND OF THE INVENTION

This invention relates to pretreatment of a mat comprising particles used in the production of reconstituted wood panels or particleboard. It relates to production apparatus and methods used in the manufacture of such panels, which are produced by first forming a loose mat of elongated wood strands, and subsequently subjecting the panels to heat and high pressure, which consolidates and forms the resulting finished panel.

The term "press racking" means undesirable lateral movement that may occur between the moving platen and stationary platen of a press during particleboard production.

The primary cause of press racking as used in this context is traceable to the forming process and is identified in industry as "shingling." The term "shingling" describes a condition wherein individual wood particles within a formed mat do not lie in a plane parallel to the forming surface, but have been deposited in an overlapping relationship with respect to one another, so that they lie in planes that form acute angles with respect to the forming surface. This condition is most easily visualized by an analogy to the shingles on a roof. It is developed because the particles are dropped onto the forming surface during translational movement between the source of the particles and the forming surface. If this translational movement is constant and in a single direction of movement, the particles will all be "shingled" in substantially parallel planes. When pressed in a direction perpendicular to the forming surface, the oblique positions of the particles result in force imbalances which are transverse to the press. While these transverse forces create rather minimal movement in the formation of a single layer of particleboard, most production presses have multiple openings, for example, 15, 20, 25 or even 40 openings. Therefore, if the lateral movement caused by a single layer of particleboard is 0.030 to 0.060 inches per press opening, the total amount of press movement of "press racking" will be in the range of 1.2 to 2.4 inches. In actual practice, this amount of deflection exceeds the maximum movement permitted by conventional press design.

Press racking is of particular significance when using elongated wood strands or particles aligned in a chosen direction relative to the panel to provide directional strength characteristics in the final product. An oriented wood product is generally described in U.S. Pat. No. 3,164,511, and also is described in U.S. Pat. No. 3,202,743, which further illustrates the "shingling" or overlapping of the strands in a manner resembling fish scales.

Several alternate methods have been considered in an effort to overcome undesirable press racking in the formation of particleboard, and particularly in the formation of reconstituted wood products containing directionally aligned strands. One such method would involve the formation of the mat during back and forth movement between the forming apparatus and forming surface. However, production techniques dictate that it is preferable to form the mat during movement in only one direction, in order that such formation can occur on a constantly moving conveyor surface. Another option is to reverse every other forming surface supporting a mat prior to introduction of the forming surfaces and mats into the openings of a press. The reversed mats would balance out the deflection forces. Again, this is practically impossible when using an in-line arrangement and a single constantly moving conveyor. Finally, a press could be designed with sufficient strength to accommodate the loads involved. However, press redesign is costly. It is more desirable to use conventional plywood or particleboard press structures in the production of specialized reconstituted wood products.

Oriented strand panels have substantially greater stiffness in one direction across the panel than in the remaining perpendicular direction. It has been found through experimentation that the greatest and most desirable ratio of stiffness in these two directions occurs where shingling within the mats is at a maximum and press racking is therefore also at a maximum. Manipulation of the orienting apparatus to reduce shingling and press racking force has been found to also lower alignment efficiency and reduce the stiffness ratio along the panel. This has dictated the need to overcome press racking outside of the mat forming process and, obviously, prior to hot pressing of the mat.

The solution disclosed herein is to subject the formed mat to rolling pressure exerted by a relatively small diameter roll powered so that the periphery of the roll in contact with the mat is moving in a direction and speed identical to that of the forming surface supporting the mat.

it is recognized that pressing rolls have been used extensively in the particleboard industry for prepressing mats after mat formation. Examples of prior patents that shown such rolls are U.S. Pat. Nos. 3,565,725 and 3,150,025. Such rolls are used to consolidate the mass in the formed mat and reduce its thickness prior to hot pressing. Rolls also have been proposed for actually pressing the mats, such as in the process described in U.S. Pat. No. 3,096,227. However, all of these prior rolls utilize large diameter rolls so that the roll force is applied to the mat over a wide area. A large diameter roll is necessary to prevent any modification to the mat structure other than reduction in thickness. The rolls are designed and used in a manner so as to not disturb the relationship of the wood particles within the mat.

In contrast, the relatively small diameter of the roll described herein does in fact modify the relationship of the particles with respect to one another. The pretreatment might be used before subjecting the mat to conventional prepress rolls in particleboard production facility.

SUMMARY OF THE INVENTION

This invention is directed to pretreatment of a mat comprising strands of wood to reduce subsequent racking. It uses a transverse small diameter roller across the path of the mat at a location downstream from the forming station and upstream from the press. The roller has a cylindrical outer surface and is mounted for rolling movement about a central roller axis. The periphery of the roller engages the upper surface of the mat in opposition to the forming surface on which the mat has been formed. The roller is driven at a rotational speed and direction such that there is no relative movement between the mat and the roller. Downward pressure is applied to the roller during mat engagement and stops are utilized to limit the minimum spacing between the periphery of the roller and the forming surface.

It is a first object of this invention to provide a pretreatment apparatus and process particularly adaptable to the production of panels including oriented wood strands or particles, capable of reducing the effect of shingling within the mat while not modifying the degree of orientation occurring in the mat and finished product.

Another object of this invention is to provide a relatively simple mechanical apparatus and method adaptable for use in conjunction with conventional equipment for forming and pressing reconstituted wood panels.

Another object is to provide an apparatus and method which is adaptable to an in-line process arrangement, incorporated along a single, constantly moving conveyor.

These and further objects will be evident from the following disclosure, which relates to specific physical developments in adapting the invention to practical manufacturing requirements. The scope of the disclosure is not to be limited by specific numerical limits set out in this discussion, except as presented in the claims that conclude the description.

DESCRIPTION OF THE DRAWINGS

FIG. 1 is a schematic elevation view of the present apparatus;

FIG. 2 is an enlarged top view as seen along line 2—2 in FIG. 1;

FIG. 3 is an enlarged schematic view of a roll; and

FIG. 4 is a schematic view illustrating press racking.

DESCRIPTION OF THE PREFERRED EMBODIMENT

The problem of "shingling" in production of reconstituted wood panels increases in severity with increasing size of wood particles. The particles or "furnish" used to form the initial mat, have become more specialized in nature depending upon the end use for which the panel is designed. For instance, when producing panels for use as furniture core stock, demands on the panel include planar stability, good screw holding capabilities, surface finishability, and improved structural strength, particularly stiffness in bending. All of these qualities are favorably influenced by increasing the proportion of larger wood particles in the furnish, using wood flakes, strands or hammer-mill particles.

Various other factors in the marketplace have influenced a trend to use larger wood particles in the production of reconstituted wood panels. Prime veneer-quality logs are becoming relatively scarce and there is economic pressure to extend the supply of existing veneer in the plywood industry. One way to accomplish this is to supplement the veneer supply with reconstituted wood panel substitutes which can be used in place of one or more layers of veneer in the production of plywood. Reconstituted wood panels can also be designed to have structural properties similar to plywood for use as a plywood substitute. The use of large flakes or particles imposes the greatest challenge in designing machinery for forming mats to achieve required levels of productivity and uniformity.

In any reconstituted wood manufacturing process it is recognized that the forming step must receive critical design attention. Beside the need to optimize productivity, it is critical that the furnish be deposited uniformly across the forming surface, which might be a wire, tray, belt, caul or plate.

In addition to the use of large flakes in panels intended for structural use, it has now been recognized that the properties of natural wood panels can best be matched in reconstituted wood panels through particle orientation of the elements in the furnish that make up the finished panel. To mechanically orient wood particles, the ratio of particle length to width must be high. They normally take the form of a strand or particle whose fiber elements are parallel over significant length dimension relative to the width of the particle or strand. Strand particles are readily oriented by mechanical means, producing a mat in which the wood fiber elements are aligned similar to the fibers in normal solid wood. In this way, maximum bending strength and minimum dimensional changes along the fiber direction due to moisture are achieved.

A very desirable structural core for composite plywood is a one-piece reconstituted wood strand panel having strand elements aligned perpendicular to the long dimension of the panel or transverse to the panel length. To produce such a core by particleboard methods, one must treat the strands with a suitable adhesive, form a mat employing the essential element of particle orientation, and subsequently bond the mat in a hot press.

The need for particle orientation in a core panel makes it necessary to place the strands in large quantities having a substantial degree of orientation across the panel. This can be accomplished at effective and efficient manufacturing rates. However, where large flakes or strands are formed into a mat for subsequent pressing, there is the resulting hazard of inducing press racking due to shingling of the flakes or strands.

This invention was developed specifically in response to press racking which developed during experimental production of an apparatus for producing cross-oriented panels of reconstituted wood for use as plywood cores. An apparatus for transversely orienting strands in such a production process is described in U.S. Pat. No. 3,896,536, titled "Orienter for Wood Strands," issued July 29, 1975. The disclosure of this patent is hereby incorporated by reference.

Testing of panels produced by equipment similar to that illustrated in U.S. Pat. No. 3,896,536 confirmed that a press racking force of great magnitude was present in each panel. This was clearly due to shingling of the strands, the shingling occurring along the narrow dimension of the strands and being therefore greatly magnified in contrast to panels formed from longitudinally aligned strands or rectangular flakes of greater dimension along the length of the panel, which is the direction of relative movement between the forming apparatus and forming surface.

Press racking is schematically illustrated at FIG. 4. A single press opening is shown, but this phenomenon is multiplied directly by the number of openings in a particular press, assuming that the mats are aligned identically so that the transverse displacements are cumulative.

The fixed press platen 20 is opposed by a movable platen 21. Pressure is exerted perpendicular to the mat 22 on caul 11 by a ram 23. Guides 24 restrain movement of platen 21 in horizontal directions. However, where shingling of strands or particles in mat 22 occurs, a resultant horizontal force (arrow 25) develops in the movable press platen, which is transmitted to the guides 24, subjecting them to deflection which can reach a damaging magnitude.

The purpose of the apparatus and method described below is to apply a simple deshingling action to the mat, after mat formation and as an integral part of the forming process. This is accomplished by applying an abrupt vertical, downward rolling force to the top surface and interior of the formed mat. The apparatus comprises a cylindrical roll extending from one side of the forming conveyor to the other in a direction perpendicular to the movement of the forming surface that supports the mat. The roll is powered so that the interface velocity of the roll periphery and the velocity of the mat surface contacted by it are identical. The roll periphery and the mat are also moved in the same direction. The roll exerts a measurable force downward against the mat. It is preferably faced with a frictional material, such as rough top belting, to assure frictional gripping between the roll and mat. The rolling action on the upper surface of the mat on the moving conveyor results in the formation of a wave in the mat immediately behind or upstream of the roll.

Referring now to FIGS. 1 and 2, a forming conveyor 10 supports cauls or plates 11 which are the forming elements on which the mats 22 are developed. The former or cross-orienter are illustrated generally at 12, and includes a vaned drum 13 that aligns the elongated wood strands in directions perpendicular to the longitudinal direction of movement of the cauls 11.

Downstream from the former 12 is the deshingling roll 14. The roll 14 is mounted to the framework of conveyor 10 by pivoted arms 15. It is powered by a roller chain drive illustrated generally at 16. The chain drive 16 is operatively connected to the drive mechanism for conveyor 10, so as to synchronize the speed and direction of rotation of the roll 14 with the speed and direction of movement of conveyor 10.

The rotational speed of roll 14 is such that the tangential velocity of the area of the cylindrical surface in contact with the mat 22 (perpendicular to a vertical plane through the axis of the roll) has a translational velocity component parallel and identical to the translational velocity of the mat. This is schematically illustrated in FIG. 3, where arrow 30 indicates the translational velocity vector of mat 22, and arrow 31 indicates the corresponding peripheral velocity vector of roll 14. Thus, there is no relative movement between the roll surface and mat at the area of engagement between the roll surface and mat.

Adjustable stops 17 in the path of the respective arms 15 limit the downward movement of the roll. The rolls 14 can be weighted to assure proper pressure, or can be subjected to downward force by springs or other external mechanisms, such as the illustrated cylinder assembly 19.

FIG. 3 schematically illustrates the general operation of the apparatus and method. The exact mechanism by which the shingling effect is minimized or canceled cannot be fully explained, but observation of the roll and mat shows clearly that a standing wave is created upstream of the roll. The standing wave formation evidently reduces the amount of shingling through the mat and consolidates the mat thickness. It does not otherwise disturb the relative direction of orientation of the wood fibers in the wood strands or particles.

At the left end of the figure, the schematic representation of the transversely oriented strands 18 illustrate the "shingled" effect in somewhat exaggerated fashion. At the right side, the shingling is illustrated as being completely eliminated, which is again a simplified conclusion, since there probably would be partial elimination of shingling as well as some retention of the original shingling and some reverse shingling in the mat as it emerges from beneath the roll 14. A standing wave created in the mat is shown just upstream to the left of roll 14, and is believed to be the area in which the deshingling action occurs.

Early experimentation with such equipment verified that the use of one or more rolls as described above not only had the desirable effect of overcoming the shingling that occurred as a result of the use of the cross-orienter, but actually was found to overcorrect the problem in certain instances. In these cases, the process created an opposite force in the press and reversed the press racking phenomena. This verified the possibility of manipulating and controlling racking forces by proper roll selection and usage.

A supplemental benefit of the use of the roll 14 with downward pressure is the fact that some initial compaction of the formed mat can also be achieved. In actual practice, a one third compaction has been found to be practical. Such consolidation is desirable in that it facilitates mat handling and transfer on subsequent conveying equipment. Where the clearance available in the press openings is critical, such consolidation facilitates entry of the mat between the platens of the press.

Also of importance is the fact that the deshingling process does not cause disruption of the oriented strands or particles in a manner that destroys the stiffness ratio in the oriented and nonoriented directions.

It is necessary here to describe a means of measuring the effect of particle orientation. Wood scientists frequently subject products to predescribed, standard test routines to obtain indication of relative strength of those materials. One of those is the static bending test as described in ASTM D1037-66. One result of this test is a value called Modulus of Elasticity (MOE), commonly called "stiffness." In a single sheet, cross-oriented strand core, an obvious difference in MOE values will exist when the product is tested in bending parallel to the direction of alignment versus that taken perpendicular to particle alignment. A ratio of these MOE values, i.e., parallel MOE/perpendicular MOE, can be used as an indication of orienting efficiency. The higher the number of ratio, the better the alignment.

In a random formed board the MOE ratio would approach (1) and the stiffness would be relatively equal in all directions. In near perfect aligned strand board, under ideal conditions, the MOE ratio is around (8). In a commercial plant the MOE ratio should fall in an acceptable range of (3 to 6).

Where shingling within the mats is at its greatest, and press racking at its worst (0.030–0.060 per press opening), the MOE ratio falls between 3–6. Any manipulation of the cross-orienting machine which results in a reduction of the racking force also caused a lowering of alignment efficiency, as seen by a reduction of the MOE ratio significantly below 3. Hence, there was an apparent need to overcome racking outside of the forming process and the hot press, i.e., after mat formation and before hot pressing.

Table I presents an illustrative series of product tests showing that the MOE ratio was not significantly reduced or modified during the deshingling process. It also shows an increasing reduction in press racking in proportion to an increase in roll pressure and mat consolidation.

TABLE I

| Panel No. | Roll Height Above Forming Surface | MOE Ratio | Percent Reduction In Racking |
|---|---|---|---|
| 1 | Control - No Roll | 5.24 | — |
| 2 | 2 inches | 5.67 | 9.3 |
| 3 | 1½ inches | 5.61 | 24.7 |
| 4 | 1¼ inches | 5.77 | 35.0 |
| 5 | 1 inch | 5.60 | 63.4 |
| 6 | ⅞ inch | 5.17 | 71.0 |
| 7 | ¾ inch | 5.18 | 75.0 |
| 8 | Control - No Roll | 5.40 | — |
| 9 | Control - No Roll | 5.12 | — |

In order to compare the effect of this apparatus and method with conventional mat prepressing devices and methods, an experiment was undertaken to determine the effect of conventional low-pressure, flat-platen, prepress methods on racking. Formed mats of a type known to cause press racking were first pressed in a cold press. Racking was observed in the cold press and measured as shown below in Table II. The same mats were subsequently hot pressed in a conventional manner and the racking of the hot press was then measured. These experiments demonstrated that flat prepressing of the mats exerted only a slight tendency to reduce racking in the hot press step, the amount of reduction being of no practical value. In both instances, a two opening press was used for the measurements.

TABLE II

| | Cold Press | | Hot Press |
|---|---|---|---|
| Sample | Prepress psi | Racking | Racking |
| 1 | 4.5 | 0.035" | 0.125" |
| 2 | 20.0 | 0.080" | 0.113" |
| 3 | 20.0+ | 0.095" | 0.112" |
| 4 | Control - No Prepress | | 0.102" |

Continuous belt prepressing, which is widely used in particle-board production, is by design constructed to simulate the action of a flat platen prepress. The belts or large diameter rolls exert a gradual downward compacting force on the mat and are operated so as not to induce any longitudinal movement of particles within the mat. Since they simulate a flat platen prepress, no reduction in racking would be assumed to result from use of such processes.

Commercial production of reconstituted wood panels, such as the cross-oriented strand panels or core stock described above, will normally require formation of the mat at more than one forming station. When the mat is formed by multiple formers, one or more deshingling rolls can be used effectively to reduce shingling. At a minimum, a single roll would be used downstream from the final forming unit. If desired, two rolls operating in tandem might be used downstream from the final forming unit. Additional deshingling rolls might be interposed downstream from any one or all the forming units.

Table III illustrates results obtained in experiments where identical mats were produced by sequentially passing a forming surface under four forming units. The deshingling roll diameter was 11 inches. In Run No. 1, the deshingling roll was not utilized. In Run No. 2 the mat, after being completely formed, was prepressed during a single pass under the roll, the roll pressure being attributed to the dead weight of the roll only. Run No. 3 is similar, but additional pressure was exerted on the deshingling roll. In Run No. 4, the mat was subjected to deshingling after passing the second and fourth forming units. In Run No. 5 the mat was subjected to four passes of the deshingling roll, each following the respective forming units.

TABLE III

| Run No. | No. Pass | Deshingling Roll Force Lbs. | Press Movement Inches | % Reduction |
|---|---|---|---|---|
| 1 | — | None | − 0.049 | — |
| 2 | 1 | 500 | − 0.022 | 55 |
| 3 | 1 | 1060 | − 0.016 | 67 |
| 4 | 2 | 1060 | − 0.013 | 73 |
| 5 | 4 | 1060 (each pass) | − 0.010 | 80 |

Table IV illustrates the reduction in press movement achieved by multiple passes of the formed mat uner the deshingling roll. Runs Nos. 2, 4, and 6 show experiments where the formed mat was passed once under the deshingling roll. Runs Nos. 3, 5 and 7 show similar mats passed under the same roll twice in succession after complete mat formation. This table illustrates that the most significant reduction in press racking occurs as a result of a single pass under the deshingling roll and that subsequent passes result in a diminishing degree of improved results.

TABLE IV

| Run No. | Passes | Deshingling Roll Dia. Inches | Press Movement Inches | % Reduction |
|---|---|---|---|---|
| 1 | — | — | − 0.049 | Control |
| 2 | 1 | 11 | − 0.020 | 59 |
| 3 | 2 | 11 | − 0.015 | 69 |
| 4 | 1 | 11 | − 0.010 | 80 |
| 5 | 2 | 11 | − 0.006 | 88 |
| 6 | 1 | 9 | − 0.011 | 78 |
| 7 | 2 | 9 | − 0.005 | 90 |

Table V shows experimental results illustrating differences in pressure or mat clearance and resulting reduction in press racking. In Run No. 4 the mat was subjected to two passes under the roll. In both Runs 3 and 4, the press racking was reversed in direction. This substantiates the conclusion that one can design the prepress station by choice of roll diameter, pressure and minimum clearance of the roll and forming surface so as to achieve a very significant reduction in press racking.

TABLE V

| Run | No. | Deshingling Roll | | Press | % |
|---|---|---|---|---|---|
| No. | Passes | Dia. In. | Clear In. | Movement In. | Reduction |
| 1 | — | — | — | − 0.059 | Control |
| 2 | 1 | 9 | 1.750 | − 0.013 | 78 |
| 3 | 1 | 9 | 1.125 | + 0.004 | 107 |
| 4 | 2 | 9 | 1.125 | + 0.016 | 127 |
| 5 | 1 | 9 | 1.500 | − 0.002 | 97 |

Experiments to date have illustrated that decreasing the roll clearance or the distance from the outer surface of the deshingling roll to the forming surface on which the mat is supported or increase of roll pressure will result in a subsequent reduction in press racking. In fact, if carried to extreme, press racking in the opposite direction might result. It also appears that increased control over press racking can be assured by use of two or more passes of the mat under the deshingling roll. However, the most significant benefit in reduction of press racking is achieved by the first pass of the mat under the deshingling roll. Experimental results also show that the action of the deshingling roll is more effective on mats formed from strands which have been screened to remove fine material than on mats where the fines are present. The action of the deshingling roll has been found to be effective through the normal range of thicknesses for reconstituted wool panels.

Roll diameter does effect the reduction in press racking. A 9 inch diameter roll has been found to be commercially acceptable for use in this process and a usable range of rolls is from 6 inches to 11 inches. Experiments with rolls having diameter of 14 inches and 18 inches showed reduction in press racking, but the results were not as good as those obtained from rolls within the range indicated.

Having thus described our invention, we claim:

1. A method for reducing the amount of press racking to which a platen press is subjected during production of reconstituted wood panels due to shingling of elongated wood strands during mat formation in which transversely wood strands overlap one another and lie at acute angles relative to a horizontal plane along the direction of movement of a forming surface on which the mat is supported, the direction of movement of the forming surface being perpendicular to the transverse orientation of the wood strands, said method comprising the following steps:

engaging the mat by a transverse roll at a location downstream of a mat forming unit and upstream of a platen press, said roll having a small uniform diameter outer cylindrical surface of 6 to 11 inches centered about a rotative axis for rolling engagement of the cylindrical surface against the upper surface of the formed mat;

urging the roll toward the formed mat to thereby apply downward pressure against the upper surface of the formed mat in opposition to the forming surface on which the mat is supported;

moving the formed mat beneath the roll at a selected translational velocity;

rotating the roll about its rotative axis at an angular velocity such that the roll periphery in contact with the formed mat tangential to a vertical plane through the axis has a translational velocity component parallel and identical to the translational velocity of the mat so that there is no relative movement between the mat and the roll at the area of engagement between them;

the roll diameter and pressure being such as to apply an abrupt vertical downward rolling force to the top surface and interior of the formed mat so as to produce a standing transverse wave across the moving mat immediately upstream of the roll which rearranges the mat structure to thereby reduce the amount of shingling therein and the consequent press racking that would othewise occur during pressing of the formed mat.

2. The method of claim 1 wherein the roll is urged downward against restraints which limit the minimum clearance between the outer cylindrical surface of the roll and the forming surface.

3. The method of claim 1 wherein the roll engages the mat without slippage occurring between the roll and the wood strands

4. An apparatus for reducing the amount of press racking to which a platen press is subjected during production of reconstituted wood panels due to shingling of elongated wood strands during mat formation, said apparatus being adapted to be utilized in conjunction with a moving forming surface on which the formed mat comprised of transversely oriented wood strands are supported; said apparatus comprising:

a roll having a small uniform diameter outer cylindrical surface of 6 to 11 inches centered about a rotative axis;

movable mounting means operatively supporting said roll about its rotative axis, said mounting means locating said roll in a transverse orientation relative to the direction of movement of the forming surface for rolling engagement between the cylindrical surface of said roll and the upper surface of a formed mat on the moving forming surface along a path leading from a mat forming unit to platen press;

force means operatively connected to said mounting means for urging said roll toward the moving forming surface, causing said roll to apply rolling downward pressure against the upper surface of the formed mat;

power means operatively connected to said roll for rotating its outer cylindrical surface in synchronism with the moving forming surface at a speed and direction such that there is no relative movement between the mat and the cylindrical surface of said roll at the area of engagement between them;

the diameter of the cylindrical surface of said roll and the amount of downward pressure applied to said roll by said force means being such as to cause the roll to apply an abrupt vertical downward rolling force to the top surface and interior of the formed mat, thereby producing a standing transverse wave across the moving mat immediately upstream of the roll, which rearranges the mat structure to thereby reduce the amount of shingling therein and the consequent press racking that would otherwise occur during pressing of the formed mat.

5. The apparatus as set out in claim 4, further comprising:

stop means operatively engageable by said mounting means for limiting the minimum spacing between the outer cylindrical surface of said roll and the forming surface beneath it

6. The apparatus as set out in claim 4 wherein said roll has an outer cylindrical surface of material capable of frictional rolling engagement of the strands, in the mat without slippage.

* * * * *